United States Patent
Cherney et al.

(10) Patent No.: US 10,412,984 B2
(45) Date of Patent: Sep. 17, 2019

(54) POPCORN POPPER

(71) Applicant: Valley Popcorn Company, Neenah, WI (US)

(72) Inventors: Dale M. Cherney, Howards Grove, WI (US); Richard D. Sorenson, Sheboygan, WI (US)

(73) Assignee: Carl Freundl, Neenah, WI (US)

( * ) Notice: Subject to any disclaimer, the term of this patent is extended or adjusted under 35 U.S.C. 154(b) by 693 days.

(21) Appl. No.: 14/807,001

(22) Filed: Jul. 23, 2015

(65) Prior Publication Data
US 2016/0249656 A1    Sep. 1, 2016

Related U.S. Application Data

(60) Provisional application No. 62/121,150, filed on Feb. 26, 2015.

(51) Int. Cl.
| | | |
|---|---|---|
| A23L 1/18 | (2006.01) | |
| A23L 7/187 | (2016.01) | |
| G05B 15/02 | (2006.01) | |

(52) U.S. Cl.
CPC .............. A23L 7/187 (2016.08); G05B 15/02 (2013.01)

(58) Field of Classification Search
CPC ......... A23L 7/187; G05B 15/02; G05B 13/00; G05B 11/00; G05B 17/00; G05B 19/00; G05B 21/00
USPC ................................ 99/323.7, 323.5, 323.6
See application file for complete search history.

(56) References Cited

U.S. PATENT DOCUMENTS

| | | | | |
|---|---|---|---|---|
| 4,937,413 A | * | 6/1990 | Spruytenburg | H05B 6/68 219/706 |
| 4,952,766 A | * | 8/1990 | McDonald | H05B 6/687 219/506 |
| 5,657,684 A | * | 8/1997 | Chaikowsky | G07F 17/0078 99/323.7 |
| 5,662,024 A | | 9/1997 | Cretors et al. | |
| 5,928,550 A | * | 7/1999 | Weiss | H05B 6/129 219/620 |
| 6,234,063 B1 | * | 5/2001 | Evers | G07F 17/0078 99/323.7 |
| 8,869,679 B2 | | 10/2014 | Ryan et al. | |
| 2013/0280386 A1 | * | 10/2013 | Cretors | A23L 7/187 426/233 |
| 2014/0251156 A1 | * | 9/2014 | Jacobsen | A23L 1/1812 99/323.9 |

OTHER PUBLICATIONS https://www.isixsigma.com/tools-templates/sampling-data/basic-sampling-strategies-sample-vs-population-data/ Jan. 2012.

* cited by examiner

*Primary Examiner* — Ibrahime A Abraham
*Assistant Examiner* — Biniam B Asmelash
(74) *Attorney, Agent, or Firm* — Thomas D. Wilhelm; Stephen C. Jensen; Northwind IP Law, S.C.

(57) ABSTRACT

A popcorn popping machine which pops popcorn in batches/cycles. A sensor on a popcorn popping machine senses pops of popcorn in the kettle. A system computer controller monitors the rate of popping sensed by the sensor and uses the beginning of the decline in the rate of popping as a basis for controlling heat to the kettle during a given cycle/batch. Activation of the dump mechanism, which terminates the popping cycle/batch, is initiated when the computer controller detects a predetermined programmed minimum pop count rate after the heat has been turned OFF.

22 Claims, 9 Drawing Sheets

POPCORN POPPER

CROSS REFERENCE TO RELATED APPLICATIONS

This application claims the benefit of U.S. Provisional Patent Application Ser. No. 62/121,150, filed Feb. 26, 2015, the entirety of the preceding application being incorporated herein by reference in its entirety.

BACKGROUND OF THE INVENTION

This invention relates to machines used for preparing popcorn and more specifically, to a popcorn machine which uses a solid state controller to control the popping operation.

Referring to FIG. 1, popcorn popping machines for concession stand, restaurant, or home use are well known. Generally, conventional such popping machines have a cabinet in which the popcorn is both popped and stored. Unpopped popcorn kernels are typically loaded into a kettle P38. The popcorn kernels are combined with salt and cooking oil, and heated. The kettle in a conventional such machine has electrical heating elements P40 as part of the bottom wall of the kettle. The heating elements heat the oil and the popcorn kernels and thereby effect popping of the kernels. As the volume of the popping popcorn expands in the kettle, an initial portion of the popped popcorn lifts the cover P44, overflows out the top of the kettle, and discharges into the popcorn cabinet. The remainder of the popped popcorn is subsequently dumped from the kettle. An exhaust blower is typically used to vent the interior of the cabinet.

In some known popcorn machines, the various parts of the machine such as oil injection, kettle heating and exhaust systems are activated manually. In such case, a user must correctly add popcorn and oil, activate the kettle heat, and turn off the kettle heat when a popping cycle has been completed. Kettle temperature is typically controlled at about 400 degrees F. Further, with manual operations, the user is subject to injury from any direct contact with hot oil, hot kettle, or hot heating elements.

Popcorn poppers currently in use share common designs, generally as follows:

A heater P40 is affixed to, or is a part of, the bottom of kettle P38, whereby the kettle and the heater are an integral, one-piece, unit, whereby any movement of the kettle is, by definition, a corresponding movement of the heater.

The heat required is generally supplied by a 220 volt AC power supply delivering approximately 5.5 kW of power to nickel-chromium heaters.

The kettle is hinged or otherwise pivotably mounted about a pivot structure, which is part of base P44, to enable dumping of popped popcorn contents from the kettle when activated manually by a worker/operator.

Because of the dump requirement, the heater in the bottom of the kettle necessarily moves with the kettle as the kettle dumps. The kettle heater is connected to the electrical power source using cable P41 and connector P42. Cable breakage from metal fatigue is limited by using heavy duty cables; although the cables cannot be so heavy as to interfere with cable movement/flexing while the kettle is being dumped.

Kettle cover P44 rises when the popped corn pushes the cover up, indicating the near termination of the popping cycle.

At the end of the popping cycle, the operator/worker turns OFF power to the heater, and dumps the popped popcorn from the kettle into the bottom of the cabinet.

The sequence of operation for some conventional popcorn poppers is as follows:

A worker turns the unit and the heaters ON, and waits for the unit to heat to operating/popping temperature.

The worker turns ON the stirring mechanism and the oil supply, thus introducing cooking oil into the kettle.

The worker raises the cover and dumps popcorn kernels and salt into the kettle, being careful to avoid splashing the hot oil from the kettle.

The worker waits for popping to begin. When the popping popcorn lifts the cover, or when the popping has almost stopped, the worker manually turns OFF the heat, grasps the dump handle, and dumps the popped popcorn out of the kettle.

The worker turns the heat back ON when he/she desires to start the next cycle of popping more popcorn.

The above process thus requires frequent intervention by a worker to prevent popcorn from burning if the heat is not turned off or the kettle is not dumped at the proper time. Or, if the heat is turned off too soon, some kernels which would otherwise pop will not have popped, leaving an excess number of unpopped kernels in the kettle.

In a more recent development, a microprocessor is integrated into the control panel of a popcorn popper in order to at least partially automate the popping cycle. Such microprocessor controls timing and power levels to preheat the oil, to pump the oil into the kettle, to turn on and off the power to the kettle, to turn on and off the exhaust fan, to turn on and off the agitator/paddle, to control intensity of heat to the kettle, and to control an alarm system sensitive to overheating of the kettle. In such system, the popping cycle is controlled by the microprocessor, using a timer which turns off kettle heating power to the nickel chromium heating elements at a predetermined time, e.g. ten minutes, after the start of the popping cycle/process.

Such popcorn popping machines have no capability to automatically dump the popped popcorn, or to start a new popping cycle without operator/worker intervention.

Nor do such popcorn popping machines have any capability to sense the actual progression of the popping process in real time, thereby to adjust timing of heat shut-off or kettle dump according to the progress of popping in the kettle.

Conventional popcorn poppers thus exhibit a number of problems, including:

The kettle and heating element are an integral package. This makes cleaning the kettle difficult since the heater cannot be immersed in water or placed in a dish washer. But if the nickel chromium heater is separated from the kettle, then heat transfer efficiency between the heater and the kettle structure is impeded.

The electrical cable connected to the heater is an integral part of the kettle/heater package and cannot be washed or placed in a dish washer.

Because the kettle necessarily moves each time the popped popcorn is dumped from the kettle at the end of each popping cycle, the electrical cable required to carry power to the heater necessarily moves, too, and thus is subject to flexural wear and corresponding breakage due to metal fatigue, resulting in maintenance and replacement expenses related to such electrical cable.

The heaters in conventional popcorn poppers are nickel-chromium heaters, which typically draw about 23 Amps at 240 VAC to produce approximately 5500 Watts of heating.

The challenge for the operator operating the popcorn popping machine is to leave the heater turned ON as long as possible in order to minimize the number of unpopped kernels, while turning the heat OFF soon enough that the popped popcorn product is not burned or otherwise degraded as a result of having been exposed to too much heat in the kettle.

The existing systems have no provision to use the actual end, or slow-down, of popping to detect the end of the popping cycle; but rather rely on either a timer, or operator discretion, to determine when to dump the popped popcorn contents from the kettle. But timers are objective devices, and are thus insensitive to variations in the time needed to pop different types of popcorn kernels, and are also insensitive to variations in heat output generated by different (e.g. first and second) heaters. Timers are also insensitive to differences in day-to-day operating conditions. So relying on timers is blind to the progress of the popping process in a particular cycle of popping of the popcorn.

Relying, instead, on operator intervention is subjective, and relies on operator skill, and good decision-making may be beyond the capabilities of sometimes-inexperienced operators. Accordingly, repeatedly making quality product is problematic for many operators of popcorn popping machines. As a result, the industry experiences significant quantities of burned and wasted popcorn, oil and salt, and/or low quality product with an excessive number of unpopped kernels, resulting in both reduced sales, and reduced profits for the owner.

In addition, there is a desire in certain instances to increase the rate at which popped popcorn can be produced, for high volume uses. Traditionally, the answer to high volume production needs has been (i) to employ additional popcorn popping machines or (ii) to increase the size of the kettle so as to pop a larger quantity of popcorn in each batch. Both answers come with their own set of problems.

Employing additional popcorn popping machines is accompanied by the requirement for additional staff to service the additional machines, accompanied by higher labor costs to the owner.

Increasing the size of the kettle avoids the requirement for additional staff, but typically provides inferior product, including increased number of unpopped kernels. In addition, larger kettles require more energy to pop the bigger batches of popcorn which, in turn, results in its own set of product quality issues typically related to burning the popcorn as a result of the need for relatively greater heat input to pop the greater quantity of popcorn kernels.

In order to achieve consistently reproducible popcorn popping, and to provide for increased production for high volume uses, it would be desirable to provide an improved operating control system as part of a popcorn popping machine including a cabinet for holding popped popcorn kernels, an electrically heated popcorn kettle located within the cabinet, a popcorn stirrer positioned within the kettle to stir the popcorn during heating, an air exhaust system for exhausting air from the cabinet, and an oil pump operably connected to a source of popping oil to supply oil to the popcorn kettle.

It would be desirable that such improved control system include electrical circuitry for connecting the kettle, the agitator, the exhaust system, and the oil pump to a source of electricity, and that such control system also include a micro-processor operably connected to the electrical circuitry to control operation of the kettle, the agitator, the exhaust system, and the oil pump during a cooking cycle.

It would further be desirable that such control system also include provision for detecting a condition or activity specific to a particular popping cycle, which informs either the operator or the micro-processor as to the degree of progress of the popping cycle, namely informing when heat to the kettle should be turned off in order to optimize the number of kernels left unpopped while avoiding burning of the popped popcorn product.

SUMMARY OF THE DISCLOSURE

This invention provides a popcorn popping machine which pops popcorn in batches/cycles. An audio sensor senses the beginning of the popping cycle, the increasing popping rate, and the decline in the rate of popping of popcorn kernels in the kettle, as well as the desired dump point, of a given cycle/batch. A programmable computer, such as but not limited to, a programmable logic computer, controller monitors the rate of popping sensed by the sensor and issues commands to turn off heat to the kettle, and to dump the popped popcorn contents from the kettle, basing the occurrence of such commands on the point in the cycle at which the decline in the popping rate is sensed and detected/determined, and the popping rate declines to a predetermined popping rate.

In a first family of embodiments, the invention comprehends a popping system for popping popcorn, comprising a kettle adapted and configured to receive popcorn; a heater adapted to heat the kettle; an audio sensor positioned in sufficient proximity to the kettle to sense popping sounds of popcorn popping inside the kettle, the audio sensor generating a series of pop signals, where each pop signal represents a time when the sound of at least one kernel of popcorn popping is detected; and a controller adapted and configured to receive information representative of respective such pop signals, to identify a sequence of popping rates over corresponding periods of time based on the pop signals so received, and to issue one or more system control commands based on changes in the popping rates.

In some embodiments, the controller determines changes in the popping rates based on the pop signals, and issues a control command based on the determined popping rate changes.

In some embodiments, the system further comprises a signal counter adapted to receive the pop signals sensed by the audio sensor and to count the number of pop signals, greater than 1 when the popping is occurring at a relatively high rate, so received over a given sampling period of time, thus to generate sample counts, each sample count representing a number of pops counted over a respective sampling period of time.

In some embodiments, a second sampling period of time overlaps the first sampling period of time.

In some embodiments, the system further comprises count accumulation capability which stores the sample counts in electronic memory.

In some embodiments, the controller turns off heat to the kettle no later than when the popping rate reflects a persistent reduction in the number of pops occurring in the kettle.

In some embodiments, the controller delays issuing the heat control command to the kettle until the number of counts in at least second and third sample counts are less than the number of counts in a first sample count, where all sample counts are taken in periods of time which are substantially equal in length.

In some embodiments, the controller delays issuing the heat control command to the kettle until the number of counts, collectively, in second and third sample counts is less than the number of counts, collectively in a first sample count and the second sample count, and wherein all such counts are taken over periods of time which are substantially equal in length.

In some embodiments, the controller ignores transient reductions in sample count.

In some embodiments, the controller discriminates between temporary reductions in sample count, and persistent reduction in sample count to cessation of counting associated with dumping popped popcorn from the kettle.

In some embodiments, the heater is an induction heater which is a separate and distinct element, not part of the kettle.

In some embodiments, the kettle is free from power cabling to the extent that the kettle can be moved and dumped without moving any power cabling.

In some embodiments, the system uses multiple sampling periods of time, and the sampling periods overlap each other.

In a second family of embodiments, the invention comprehends a control system adapted and configured to control operation of a popcorn popper, the popcorn popper including a heated kettle, the control system comprising an audio sensor positioned in sufficient proximity to the kettle to sense popping sounds of popcorn popping inside the kettle, the audio sensor generating a series of pop signals, where each pop signal represents a time when the sound of at least one kernel of popcorn popping is detected; a signal counter adapted to receive the pop signals sensed by the audio sensor and to count the number of pop signals so received over a given sampling period of time, thus to generate sample counts, each sample count representing a number of pops counted over a respective such sampling period of time, the sample counts being stored in an electronic memory; and a programmable computer controller, having a processor and a memory, the programmable computer controller being programmed, and thus being specifically adapted and configured, to compare the sample count in a first such sample taken over a first such sampling period of time with the sample count in a second subsequent such sample taken over a second such sampling period of time.

In a third family of embodiments, the invention comprehends a control system adapted and configured to control operation of a popcorn popper, the popcorn popper including a heated kettle, the control system comprising an audio sensor positioned in sufficiently close proximity to the kettle to sense popping sounds of popcorn popping inside the kettle, the audio sensor generating a series of pop signals where each pop signal represents a time when the sound of at least one kernel of popcorn popping is detected; a signal timer adapted to receive the pop signals from the audio sensor, where each pop signal represents a time when the sound of one kernel of popcorn popping is detected, the signal timer determining at least one of the time periods between such pop signals, and time periods over which sets of such pop signals are received, the time periods for at least one of receiving respective ones of the pop signals, or receiving sets of sequential pop signals being stored in an electronic memory; and a programmable computer controller having a processor and a memory, the programmable computer controller being programmed, and thus being specifically adapted and configured, to compare the time periods between at least one of respective sequential ones of the pop signals, or respective sets of sequential ones of the pop signals, thereby to identify a sequence of popping rates over corresponding sampling periods of time, and to issue a control command based on changes in the popping rates so identified.

In some embodiments, the popping rates are collected over periods of time which overlap each other.

In some embodiments, the popping rates are stored in electronic memory.

In some embodiments, the programmable computer controller issues a heat control command turning off heat to the kettle based on the changes in the popping rates so identified.

In some embodiments, the programmable computer controller issues a heat control command, turning off heat to the kettle, no later than when the popping rate reflects a persistent increase in the timing between pops in the kettle.

In some embodiments, the programmable computer controller delays issuing a heat control command, turning off the heat to the kettle, until the popping rate in at least second and third sets, collectively, of pop signals is less than the popping rate in a first set of pop signals.

In some embodiments, the programmable computer controller delays issuing a heat control command, turning off the heat to the kettle, until the popping rates in second and third sets, collectively, of pop signals is less than the popping rates in a first set and the second set, collectively, of pop signals.

In some embodiments, the programmable computer controller ignores transient reductions in the popping rate.

In some embodiments, the programmable computer discriminates between temporary reductions in popping rate, and persistent and substantial reduction in popping rate to a cessation of popping associated with dumping popped popcorn from the kettle.

In a fourth family of embodiments, the invention comprehends a method of popping popcorn, comprising using a heater, heating popcorn in a kettle; using an audio sensor positioned in sufficiently close proximity to the kettle to sense popping sounds of the popcorn popping inside the kettle, thus to identify sounds of popcorn popping in the kettle, and generating a series of pop signals where each pop signal represents a time when the sound of at least one kernel of popcorn popping is detected; and a programmable computer controller receiving such pop signals sensed by the audio sensor and issuing a control command based on changes in the times between such poppings as represented by respective ones of the pop signals.

In some embodiments, the method further comprises the programmable computer controller issuing a heat control command based on changes in timing between respective ones of the pop signals.

In some embodiments, the method further comprises storing respective ones of at least one of the sample counts, or the popping rates, in electronic memory.

In some embodiments, the method further comprises turning off heat to the kettle no later than when timing between the pop signals represents a persistent reduction in the number of pops occurring in the kettle.

In some embodiments, the method further comprises turning off heat to the kettle when timing between the pop signals in at least second and third sets of samples is greater than the timing between the pop signals in a first set of samples, where all sets of samples include the same number of pop signals.

In some embodiments, the method further comprises turning off heat to the kettle when timing between the pop signals, in second and third sets of samples, collectively, is greater than the timing between the pop signals, in a first set of samples and the second set of samples, collectively, where all of the sets of samples include the same number of pop signals.

In some embodiments, the method includes ignoring small increases in the time between pop signals.

In some embodiments, the method includes the programmable computer controller discriminating between temporary increases in the timing between pop signals, and persistent increase in the time between pop signals to cessation of popping associated with dumping popped popcorn from the kettle.

In some embodiments, the method includes heating the kettle with an induction heater which is a separate and distinct element, not part of the kettle.

In some embodiments, the kettle is free from power cabling to the extent that the kettle can be moved and dumped without moving any power cabling, including dumping popped popcorn from the kettle without necessarily moving any power cabling.

DETAILED DESCRIPTION OF THE ILLUSTRATED EMBODIMENTS

Figure 1:
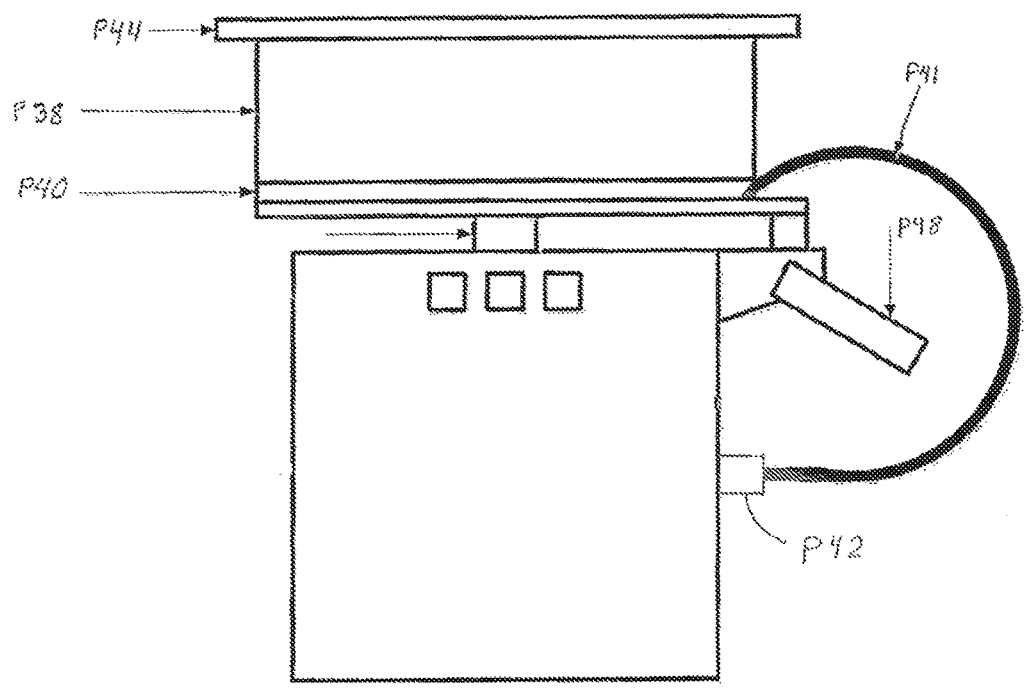
FIG. 1 is a schematic diagram showing portions of a conventional popcorn popping machine.
Figure 2:
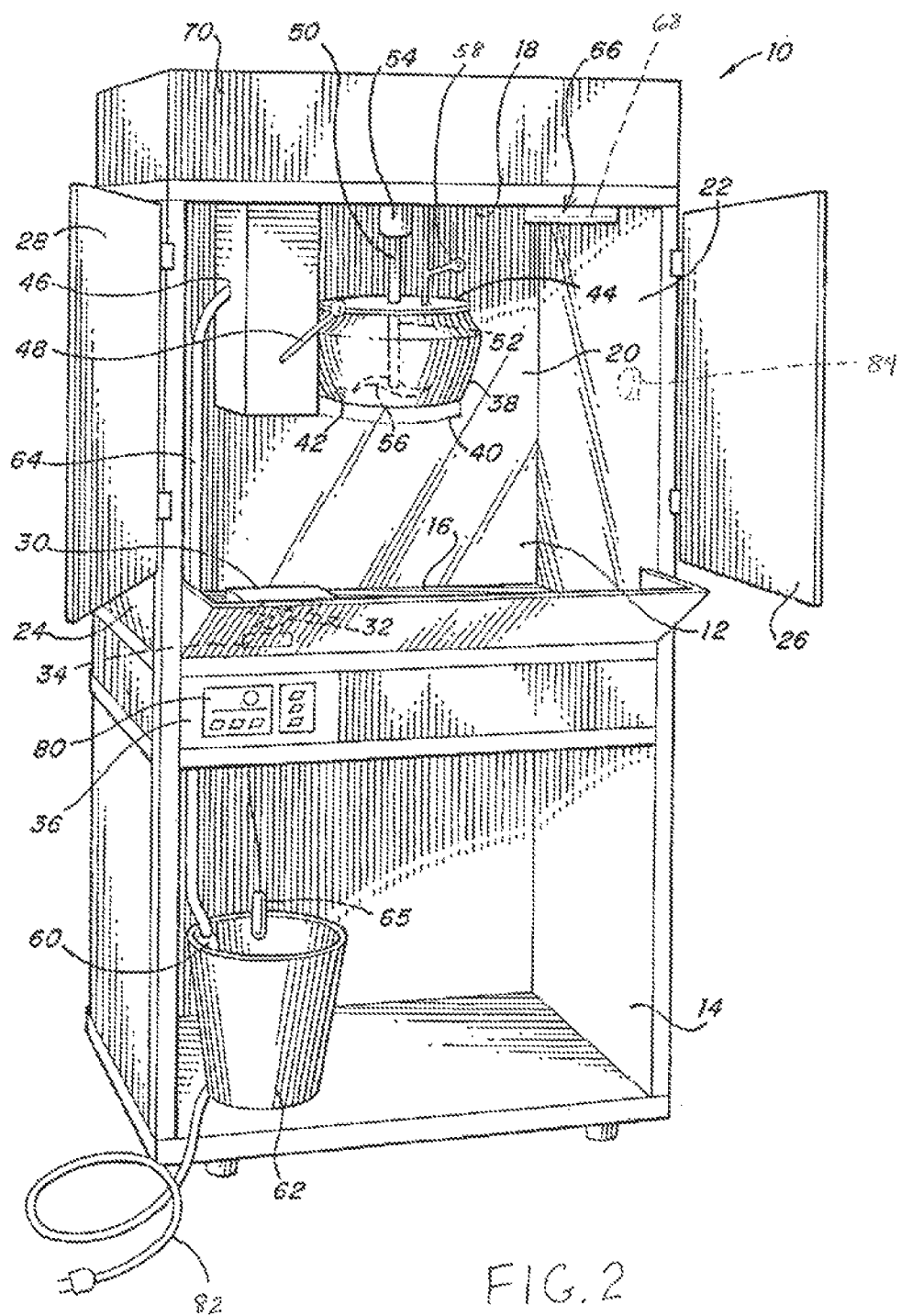
FIG. 2 is a perspective view of a popcorn popping machine of the invention.

FIG. 2 shows a perspective view from the operator's side of a popcorn popping machine 10 which can incorporate an operating control system according to the present invention. Popcorn popping machines are generally stand alone units which are used for the intermittent, though optionally continuous, production of popped popcorn. Popcorn popping machine 10 includes a cabinet 12 within which popcorn is both produced, and temporarily stored for dispensing, such as for sale. Popcorn popping machine 10 also includes a storage section 14 which can be used to store supplies such as extra unpopped kernels of popcorn, cooking oil, containers, and the like.

Cabinet 12 has a bottom shelf 16, and a top wall 18, and is enclosed by a rear wall 20, a pair of side walls 22 and 24, and a pair of hinged doors 26 and 28. Doors 26 and 28, and the side walls 22 and 24, are typically made of Plexiglas® or other clear plastic to allow a view of the interior of the cabinet, including a view of the popping process, as well as a view of the popped popcorn which is stored in the cabinet. Doors 26 and 28 provide access to cabinet 12, to permit the operator to carry out cooking operations and to dispense the popped popcorn so produced, when desired.

Cabinet 12 has a hot air recirculating conditioner 30 mounted under bottom shelf 16 and between cabinet 12 and storage section 14. Conditioner 30 includes a blower 32 and a heating element 34 which, collectively, operate to force hot air through the popped popcorn in cabinet 12 to keep the popcorn warm until the popped popcorn is sold/served to a customer. An e.g. programmable computer controller 36 is mounted under bottom shelf 16 and between cabinet 12 and storage section 14. Computer controller 36 can be any of a wide variety of suitable controllers having memory, processor, and programming input capability.

The popcorn kernels are placed into a kettle 38 which is suspended from top wall 18 of cabinet 12. Kettle 38 is typically constructed of stainless steel. Induction heater 40 is supported by a support column 46 extending from top wall 18 of cabinet 12. Heater 40 is positioned below, and in substantial contact with the bottom of kettle 38, except when the kettle is being dumped. Heater 40, when activated, is utilized to heat the kettle, and the oil contained within the kettle, thereby to pop the kernels of popcorn in the kettle. In some instances where heightened levels of monitoring and control are desired, an optional thermocouple 42 is mounted on, or incorporated into, kettle 38. Thermocouple 42, where used, is connected to computer controller 36, and can be used, if desired, to sense the temperature of the kettle, and to report the sensed temperature to computer controller 36.

Kettle 38 is supported on a pivot axis, e.g. a pivot rod (not shown), supported by support column 46. A kettle dump handle 48 is rigidly connected to kettle 38 so that, by rotating the dump handle, the kettle can, if desired, be manually tipped/rotated about the pivot axis to discharge/dump popped popcorn from kettle 38 into cabinet 12.

Kettle 38 has a cover 44 which, like kettle 38, is circular in shape and is suspended by means of a support rod 50 which extends through the center of cover 44. Support rod 50 encloses a drive shaft 52, illustrated in FIG. 4, which is connected to a motor 54 on one end and is connected at the other end to an agitator 56 having a number of mixing blades. Agitator 56 is rotated by motor 54 to agitate the kernels of popcorn in kettle 38. Cover 44 may be opened via a cover lift rod 58 to add fresh/new kernels to the kettle.

An oil pump 60 is operably positioned in an oil container 62 which is located within storage section 14. Oil pump 60 draws oil from oil container 62 through a tube 64 which conveys the oil to kettle 38. The oil may initially be in solid form in container 62, depending on ambient conditions, and is liquified as needed by a heating element 65 which is inserted into the oil to ensure that the oil is sufficiently fluid to be pumped. In order to ensure that the oil is sufficiently fluid, heating element 65 may be operated for about 30 minutes prior to initiation of popping operations, and periodically thereafter as needed. Oil pump 60 is inserted into oil container 62 and is used to inject the liquified oil into kettle 38 via tube 64. When the oil in container 62 has been completely consumed, the entire oil container may be replaced by a new container of oil or may be simply refilled if the available supply of oil is already liquid.

An exhaust blower 66 is mounted on top wall 18 of cabinet 12 for venting the interior of the cabinet where popcorn kernels are popped in kettle 38, and where popped popcorn is temporarily stored before being dispensed e.g. to customers. A charcoal filter 68 is included as part of exhaust blower 66. Thus any undesirable odors and oil vapors may be reduced or eliminated from the area around the popcorn machine. Exhaust blower 66 is coupled to, and controlled by, computer controller 36. A light 70 is mounted in top wall 18 to illuminate the inside of the cabinet, and provides further warming heat for the popped popcorn. The user can initiate the operation of popcorn machine 12 via a control panel 80 which is mounted below hinged doors 26 and 28. A power cord 82 is connected to computer controller 36 to provide popcorn machine 10 with the necessary electrical power to operate the various components. Power cord 82 is a conventional three wire power cord which can be plugged into a normal 120 volt AC power source.

All of the machine elements described above are operatively interconnected, and are functionally controlled by computer controller 36. Computer controller 36 is activated by a switch which is part of control panel 80.

Popcorn machines of the invention include, as functioning elements, kettle 38, a heater, optional popcorn kernel storage, and computer controller 36, as well as an audio sensor discussed in more detail hereinafter. The computer controller, which is used to effect largely automatic and safe operation of the machine, has a memory, and a processor which is programmed to operate the machine functioning elements to control the popcorn popping sequence in a safe and efficient manner.

In preferred, but not limiting, embodiments, kettle 38 and heater 40 are separate and distinct elements. In such embodiments, the kettle can easily be removed from the remaining elements of the machine and can be placed in a dishwasher for cleaning. The heater, in such embodiments, is fixedly supported by e.g. support column 46 and does not move. This eliminates the typical maintenance and replacement issues associated with flexing heater cables and connectors. The stirring mechanism and cover, as well as the kettle can be removed and cleaned in a dishwasher if desired.

In preferred embodiments, popcorn popping machines of the invention utilize induction heating as heat sources separate and distinct from the kettle structure, rather than nickel-chromium heating elements in the kettle structure.

By using induction heating instead of nickel chromium conduction heating elements, for a given size kettle, popping the same amount of popcorn, power consumption is reduced from about 5500 watts using a 240 volt AC power cord, separate from the power cord supplying the control panel, to about 1200 watts using 120 volts AC, drawn from the same power cord 82 which is used to power control panel 80 and computer controller 36. Because heater 40 is an induction heater, transferring heat from the heater to the kettle structure by conduction is not necessary, whereby the heater need not be in intimate contact with the kettle. Accordingly, heater 40 can be, and desirably (but not necessarily) is, a distinct structure, separate from the kettle.

Linear actuators, or other known translation devices, are used to dump the kettle and raise the stirring mechanism. Other conventionally-known translation devices can be used in place of the linear actuator. Accordingly, the motion problems of lifting the kettle in popcorn popping machines having an automatic cycle have been eliminated whereby the automatic cycle is a cost effective reality. The low cost linear actuator cylinders are positioned to allow accurate positioning of the motions of the kettle.

As desired, a popcorn reservoir and an oil reservoir can be set up to automatically feed predetermined measured quantities of popcorn and salt, and oil, to the kettle, thereby to allow the machine to run without operator intervention.

Figure 3:
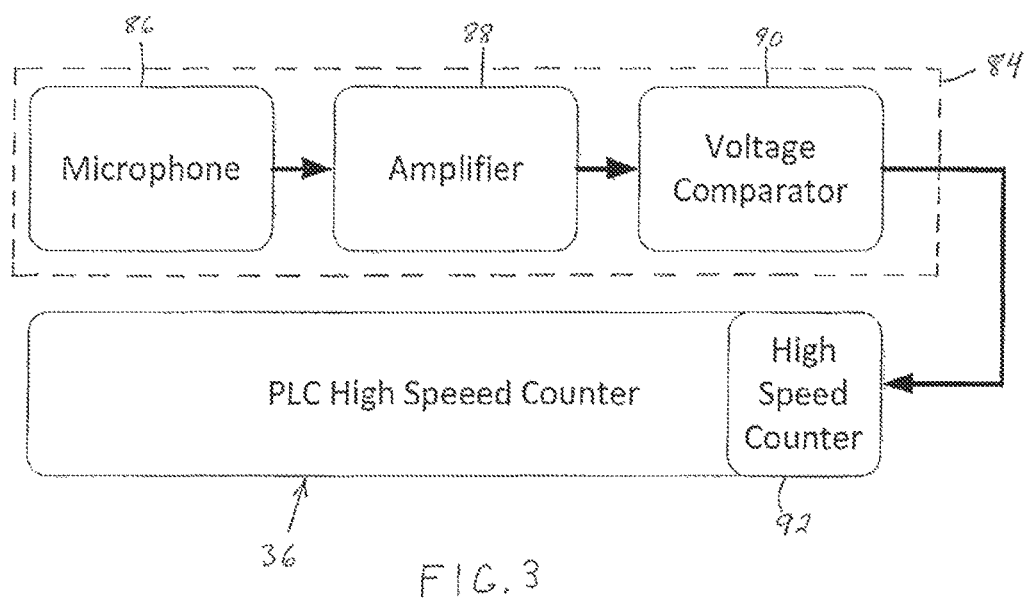
FIG. 3 is a block diagram of an audio sensor subsystem useful in this invention.

Popcorn poppers of the invention utilize one or more audio sensors 84, illustrated in FIG. 3, mounted so as to be in close proximity to the kettle while the kettle is in position for the bulk of the popcorn popping as illustrated in FIG. 2. Such close proximity of the audio sensor to the kettle enables the audio sensor to sense the sound of individual kernels of popcorn popping in the kettle, and to generate corresponding pop signals representing the respective popping sounds. The pop signals are ultimately used by computer controller 36 as part of a process for determining the end of the popping cycle, thereby to automatically control the heat input to the kettle, as well as to determine when the end of the popping cycle has been reached, thus to automatically control the heat, and to subsequently dump the kettle.

Using the cycle dynamics of popping rate decline as the determining factor in turning OFF heat to the kettle is a first factor in reducing the risk of burning the popcorn. With the heat turned OFF, computer controller 36 continues to monitor the popping rate. When the popping rate decreases to a predetermined slower rate, for example and without limitation 5 pops in a 5 second sample count period, computer controller 36 activates the dump cycle. In the dump cycle, lift mechanism 94 lifts cover 44 and agitator 56 high enough that kettle 38 can be dumped without touching the agitator or the cover. With the cover and agitator so lifted by lift mechanism 94, linear actuators 96 are activated to rotate the kettle about its pivot axis and thus to dump the now-popped popcorn out of the kettle. By dumping the popped popcorn out of the kettle, again in response to the still further slowed popping rate, the popcorn is removed as soon as practical from the intense heat of the kettle and quickly cools to a lower but still warm temperature where burning of the popcorn will not occur. So the critical sensing of the effective end of the popping cycle further enables not only removing of heat by shutting off heat input to the kettle; it also enables removing the popped popcorn from the residual, but still intense, heat of the kettle. Thus, the methods of the invention implement two critical steps, both based on sensed popping rate, to terminate heat input into the popcorn, and to initiate reducing the temperature of the popped popcorn to temperatures at which the popcorn will not burn.

So automating the actions at the end of the popping cycle increases productivity by limiting worker intervention to only loading the kettle with popcorn and salt, and pressing the start/go button; and increases quality of the popped popcorn product by avoiding burning of the popped popcorn product.

Referring to FIG. 3, the sound of popcorn popping is received in audio sensor 84 by a conventional microphone 86. The background output of the audio sensor produces an analog signal which represents ambient noise. Since ambient noise is typically an extremely low intensity signal, it is necessary to amplify the signal with e.g. analog amplifier 88. The output of the amplifier is fed into a voltage comparator 90. The voltage comparator compares the input signal to a preset reference voltage. Whenever the input signal exceeds the reference voltage, the voltage comparator output turns ON and remains ON so long as the input signal exceeds the reference level. This forms a pop signal each time a kernel of popcorn pops in the kettle. The input pop signal is filtered to look for a popping frequency using a conventional R-C network. The output pop signal, which can be in the form of a square wave, is fed into high speed counters 92 in computer controller 36.

A first counter 92 is used to provide a PLC filter for a second counter. This first counter is set each time the voltage comparator output signal goes from a logic high to a logic low and is latched for a preset period of time to provide a low frequency filter for the second counter. This assures that only one pop will be registered into the counter for each pop assuming that a second pop occurs during the latched period of time.

The second counter can be implemented in numerous different ways. A first exemplary method of implementing the second counter is to time a sampling period of e.g. 5 seconds, and count the number of pops within the sampling period. At the end of the sampling period, controller 36 reads the counter to determine the number of pops occurring in the sampling period. This method of counting allows for a variation of popping frequency within the sampling period, which occurs normally in the popping cycle. Such variations are inherently averaged when the counts are collected over a set, e.g. 5 second, period of time, thus indicating a true trend, for control purposes, in the popping rate. The second counter is reset at the end of the e.g. 5-second sampling period after the computer controller reads the contents of the counter to determine any action which should be executed based on the count.

A second exemplary method of implementing the second counter is to determine the times between individual ones of the pops, namely the pop signals, thus to determine the popping rate. This method is more subject to variations between pops, and requires additional filtering of the raw data, but can be used in determining the popping rate.

A popping cycle, which pops a single batch of kernels of popcorn in the kettle, can be envisioned/thought of in terms of three separate, yet connected, periods of time.

The first period of time of the popping cycle starts when power is applied to the heater and continues, as the heater heats up, until a predetermined number of pops is achieved within the sampling period. When this predetermined number of pops is achieved within the sampling period, the process/cycle, seamlessly and without interruption, moves to the second period of time of the popping cycle.

The second period of time of the popping cycle is the main popping period where the majority of popping occurs; where the popping of popcorn kernels starts at a relatively slow, but audibly discernible, rate and increases to a very rapid rate of popping. The process remains in this second period of time until the overall rate of popping begins to slow down.

Using the first method of implementing the second counter, the slow-down in the rate of popping is determined by comparing the most recent count of the number of pops for a given sampling period, as a subsequent/second sampling period, to the count of the number of pops for the previous/first sampling period. So long as the most recent count is equal to or greater than the previous count, the popping process is continuing to operate in the second period of time of the cycle.

When the most recent count is less than the previous count, the popping rate may be declining. When controller 36 definitively determines that the popping rate is declining, the controller turns the heat OFF; and the popping continues at a slowing rate and ultimately stops. Multiple outputs can be actuated/triggered based on the declining popping rate, such as raising the lid on the kettle, turning the kettle heat off, and raising the agitator mechanism drive.

The challenge, which has not before been met successfully by the industry, is to identify the point in time in the popping cycle when the popping rate has begun its actual ongoing and terminal decline.

The potential for having entered a terminal declining popping rate, optionally an alert signal, is triggered the first time the count for a sampling period is less than the count for the defined previous sampling period. According to one set of embodiments of the invention, the existence of a declining popping rate is confirmed when the count for the next subsequent selected number of sampling periods is also lower than the count for the defined previous sampling period. When it is determined that the popping rate is in decline, the need for continued application of heat is determined to be completed whereby power to the heater is turned off, the stirring mechanism is retracted, and the dump sequence begins.

In the invention, the audio sensing of the number of pops in a sampling period, or the audio sensing of time between pops, however filtered or aggregated, provides the foundation for determining, projecting, the end of the popping process/cycle for a given load/batch of popcorn, salt, and oil.

Namely, the determination of when a kettle of popping popcorn should be turned off, and when the kettle should be dumped, is determined by changes in the rate at which the popcorn in the kettle is popping.

While commencement of popping during the first period of time in the popping cycle starts slowly, and builds gradually, once the second period of time has been entered, the peak popping rate is reached fairly quickly, and the drop-off in popping rate happens rather quickly, such that the time between peak popping rate and end of substantially all popping is a matter of less than 1 minute. Accordingly, it is important to detect the beginning of the decline in the popping rate as quickly as possible, whereby relatively short sampling periods of e.g. 5 seconds or less are indicated.

The number of sampling periods which must show decline before the decline to a termination of the cycle is detected, established, and confirmed by the computer controller depends, at least in part, on the length of the sampling period. Relatively shorter sampling periods require a greater number of sampling periods to establish/confirm a declining popping rate with a reasonable degree of certainty.

By contrast, relatively longer sampling periods can establish a declining popping rate with fewer sampling periods. However, the longer the sampling period, the greater the time elapse from actual beginning of the decline in the popping rate to the time when such decline is confirmed by computer controller 36. Accordingly, it is desirable to use a relatively shorter sampling period which is long enough to express a popping rate which can be reliably used in determining the beginning of the popping rate decline. To that end, a sampling period of about 3 seconds to about 10 seconds, optionally about 4 seconds to about 8 seconds, optionally about 5 seconds, has been found to be acceptable when using what are currently-conventional kettle sizes, popcorn batch sizes.

Popcorn poppers of the invention turn off the heater based on the actual rate of popping of popcorn during a given popping cycle, namely through heat control commands issued by computer controller 36. Preferred embodiments of the invention use an induction heater, separate from the kettle, to heat the kettle. Because the heater does not generate heat in the kettle by itself becoming hot, transfer of heat to the kettle after the power is shut off is avoided, whereby heat generation in the kettle, after power to the heater is turned off, is more precisely controlled than with nickel chromium heaters. Because the heater is separate from the kettle, the heater does not move while the kettle is being dumped. Because the heater does not move, as the kettle moves during the dump process, the kettle is spaced from the heater whereby the heater does not add heat to the kettle after power to the heater is turned off, which allows for more rapid reduction of the temperature of the kettle, which provides more precise control of the temperature inside the kettle, thus reducing the risk of burning the popped popcorn while the popcorn is being dumped. Such improved temperature control is one more way popcorn popping machines of the invention increase the quality of the popped popcorn product.

Figure 4:
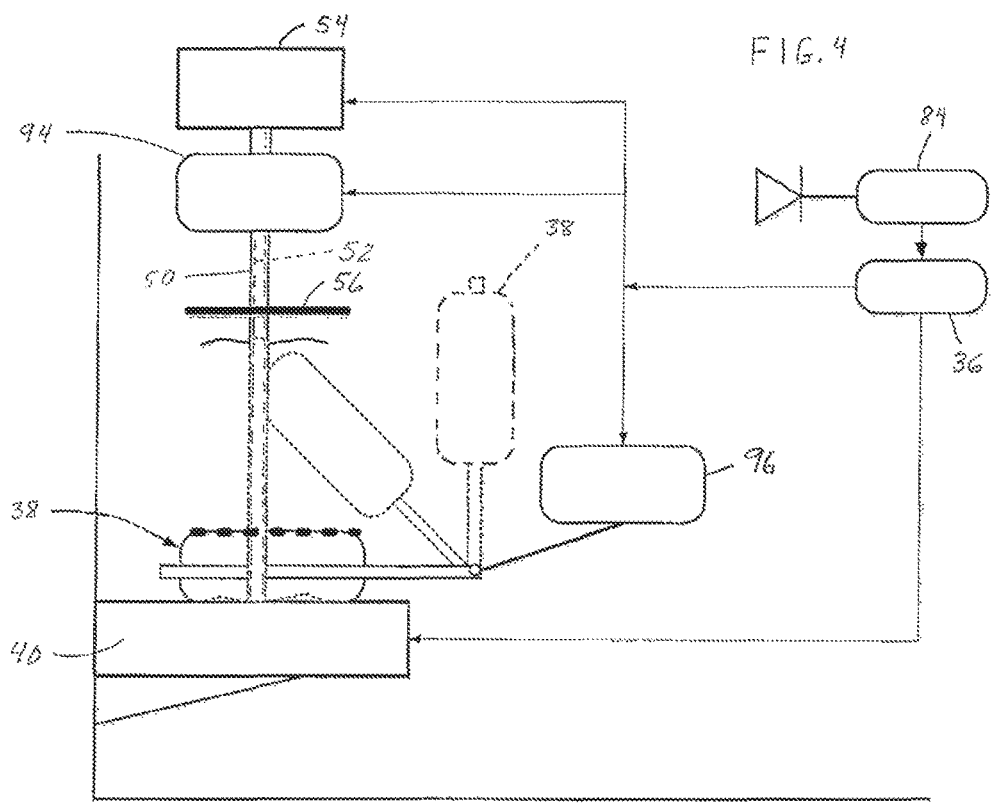
FIG. 4 is a schematic diagram illustrating, overall, the structural operating elements of popcorn popping machines of the invention.

A diagram of the system of the invention, including the agitator mechanism, is shown in FIG. 4. FIG. 4 shows agitator 56 being lifted vertically from kettle 38 by a lift mechanism 94. Other lifting formats/designs are contemplated as being possible. The critical requirement is that the lift mechanism remove the agitator and the agitator drive from the path to be travelled by the kettle while the kettle is being rotated/inverted to dump the popped popcorn from the kettle as illustrated in multiple dashed kettle positions in FIG. 4.

The agitator mechanism includes an agitator prime mover, such as electric motor 54 having an output shaft. The motor output shaft is connected to drive shaft 52. The drive shaft extends through the kettle cover, e.g. along a vertical axis of the kettle, and to a position near the bottom of the kettle. Stirring agitator/paddle 56 is connected to the terminal end of the drive shaft. As with conventional popcorn poppers, the bottom of the paddle makes nominal, low resistance, contact with the bottom wall of the kettle, and the rotation of the paddle overlies substantially all of the area of the bottom wall of the kettle, thereby to contact, and stir, substantially all of the kernels of popcorn which are in contact with the bottom wall of the kettle.

The drive shaft is split. Namely, a lower portion of the drive shaft extends through the kettle cover and downwardly to the bottom portion of the kettle. The agitator, being mounted to the drive shaft, is also indirectly mounted to the kettle cover. An upper portion of the drive shaft interfaces with, connects with, and makes a drive connection with, the lower portion of the drive shaft. The upper portion of the drive shaft extends up from the connection with the lower portion of the drive shaft, and makes driven connection with the motor. Such driven connection can be direct to the motor output shaft, or can be indirect through one or more other shaft elements, and may include one or more turning gears or other turning devices, whereby the drive motor can be positioned either directly above the kettle as shown in FIG. 2, or can be mounted transversely away from the kettle axis, thus to a side of the kettle. With the motor to a side of the kettle, the kettle can be lifted e.g. for the purpose of dumping a load of popped popcorn from the kettle without concern about interference between the kettle and the motor as the kettle is being lifted and dumped. Such mounting of the motor to a location beside the kettle keeps the motor further away from the heat generated by the kettle for increased motor reliability/service life Improvements in the invented system include, without limitation:

A process for making popcorn which utilizes an audio input as a foundation for controlling an automatic popping sequence for producing popped popcorn.

The process includes a computer based control system which detects, and uses, the popping rate to monitor and regulate the progress of the popping cycle.

A three phase counting algorithm for detecting the start of the popping cycle, the rapid popping phase of the popping cycle, and the slow down phase of the popping cycle, to determine the timing of end-of-cycle steps.

An audio sensor for detecting the beginning of the slowing down, declining, in popping rate, thus to sense and project the upcoming termination of the popping cycle based on popping rate. When the decline in popping rate is established, the cover and agitator are raised and the heat is turned off.

A counter counts the number of pops in a sampling period to monitor and determine the progress of the popping cycle as basis for timing the issuing of commands which effectively bring an end to the popping cycle.

A counter, and electronics, average sequential pop counts in order to be able to automatically ignore variations in popping frequency for transient sampling periods which are not representative of the average popping rate.

In some embodiments, the sampling period is replaced by the counter counting the time between pops to determine, in real time, actual changes in the popping rate. Such time periods are averaged in order to establish a persistent rate representative of whether the popping rate is actually accelerating or declining.

Linear actuators 96 are used to move the kettle from its popping position as suggested in solid lines in FIG. 4, to its dump position which is shown twice, in two different positions, in dashed outline in FIG. 4. Movement of the linear actuators is controlled by computer controller 36.

Pop counter 92 is monitored by the computer controller, indicating the completion of a popping cycle when the popping rate begins a persistent decline.

Control panel 80 has options for selecting the mode of the popper operation to be either manual feed of popcorn and oil or automatic feeding of popcorn and oil.

Loader drivers for the popcorn, oil, and salt or seasoning are adapted to automatically add popcorn, salt, and oil to the kettle as desired in automatic mode, and thereby to allow the system to run without operator intervention in a continuous automatic mode of operation other than to load popcorn, oil, and salt into their respective popcorn, oil, and salt reservoirs.

By running the system in automatic mode, whereby the system automatically starts a new popping cycle upon completion of an existing cycle, with fresh automatic inputs of salted popcorn kernels and oil, and running the system on a continuous basis, the system experiences essentially no down time. Accordingly, energy and operator inputs are optimized lower, and a given amount of popped popcorn product can be produced with a smaller kettle, and thus a smaller, lower power heater input.

Figure 5:
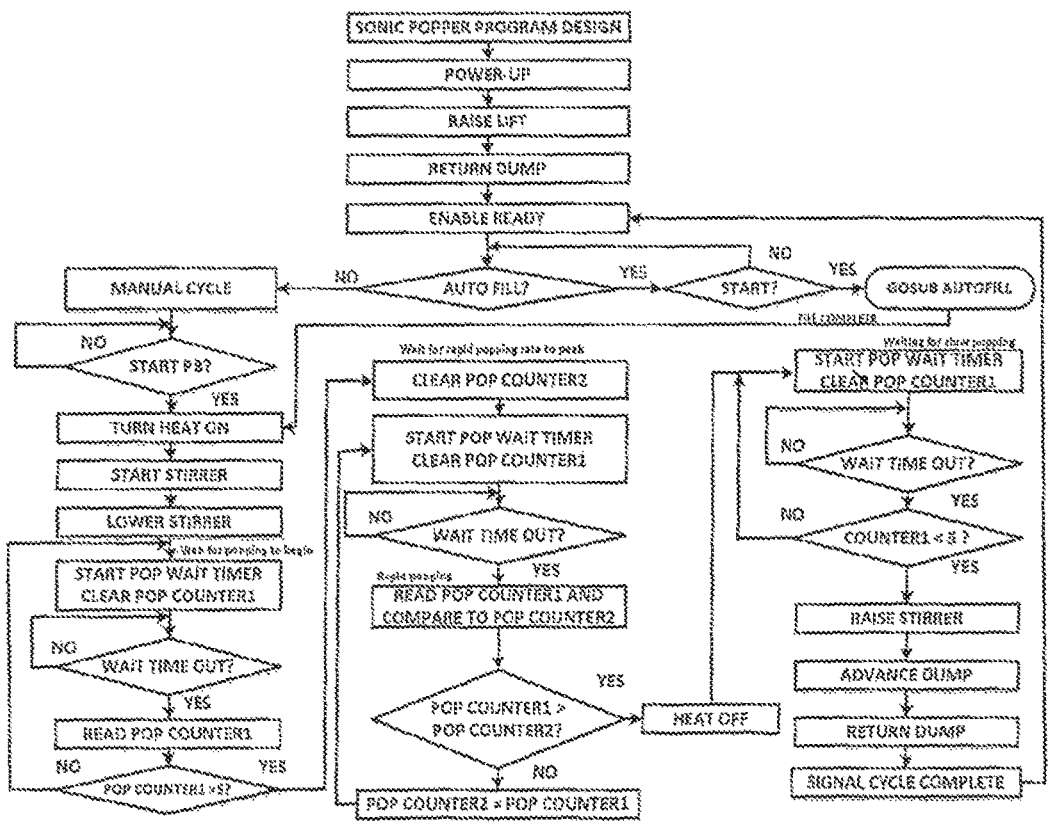
FIGS. 5 and 6 are flow charts illustrating using the number of pops counted in a sampling period as an example of one method of determining when heat to the kettle is to be turned OFF.
Figure 6:
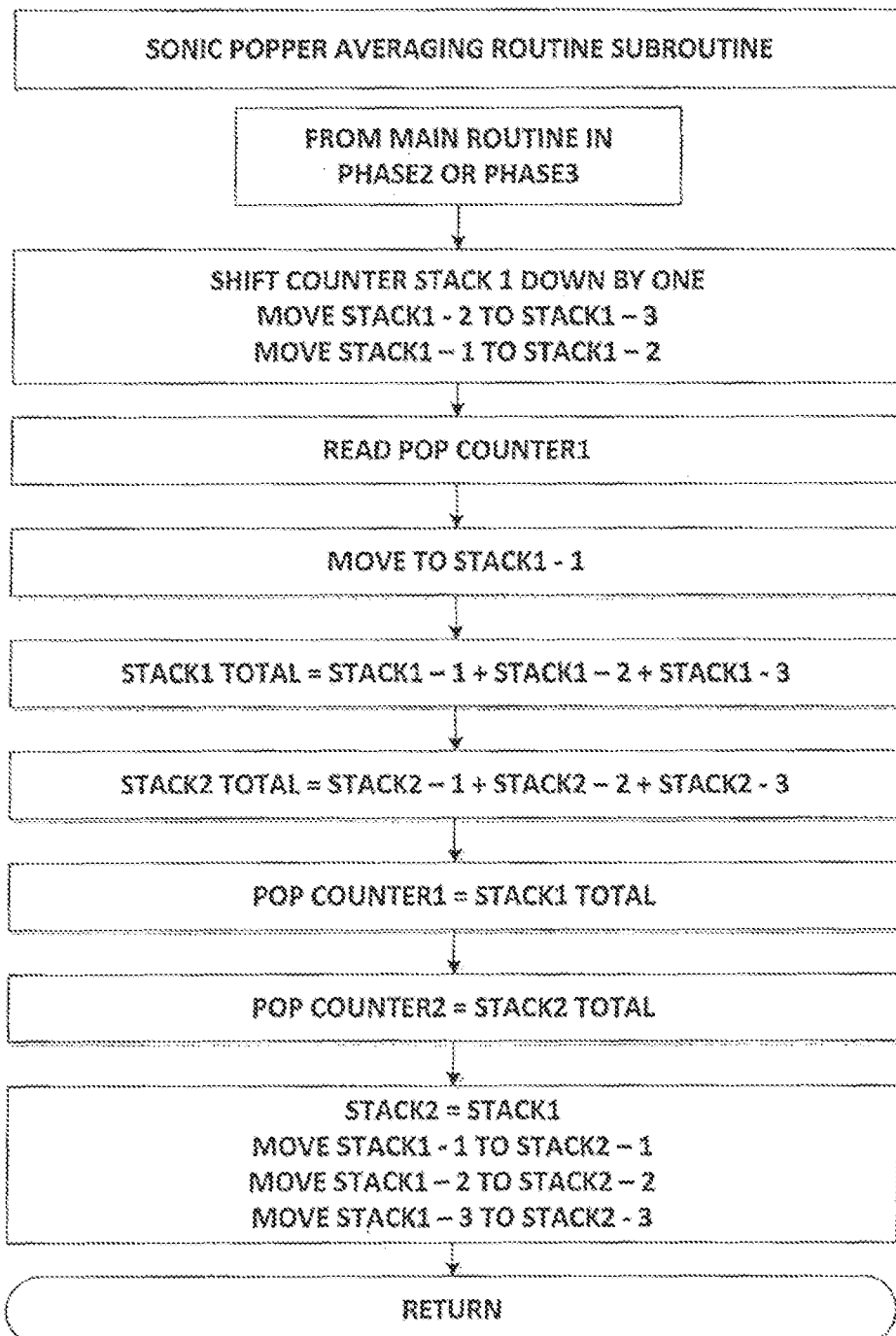

A program flow for an illustrative system is depicted in FIGS. 5 and 6. FIG. 5 illustrates using the accumulated count in a specified sampling period to control the popping sequence. This process involves a sampling period which can be determined through routine experimentation for a given popcorn machine design. A useful, but not limiting example, is about 5 seconds for the sampling period.

While sequential sampling periods can be used to identify the beginning of the declining of the popping rate, averaging, using overlapping sampling periods, thus to define a simple moving average of the popping rate, provides smoother, more reliable decisions regarding especially the beginning of the decline of the rate of popping of the popcorn as the number of unpopped kernels which can be popped declines. Such averaging ignores minor and/or transitory variations in the popping rate. Use of such overlapping time periods provides second-level averaging analysis for determining when the popping rate has moved into a persistent reduction in sample count to cessation of counting associated with dumping the popped popcorn from the kettle, thus regarding when the heater should be turned off.

The amount of overlap of the sampling periods, and the number of overlapping sampling periods, are related to the sensitivity of the results to the actual popping rate and the delay in detecting the inflection point between an increasing popping rate and a declining popping rate.

Namely, in order to increase the sampling time while retaining the sensitivity of the results, provided by relatively shorter sampling periods, to the time period when substantially all of the popcorn kernels have been popped, while limiting or eliminating any burning of the popcorn, two or more sample counts, taken during overlapping periods of sampling time are averaged to get a calculated simple moving average of the number of pops per sample period. By using the simple moving average, transient reductions in sample count were accounted for by the popping rates before and/or after the sample count which contain such transient reductions or increases. For example and without limitation, a three element stack, illustrated in FIG. 6, can be used to save the last three counter readings. Two stacks are used. STACK1 is the current stack with the current value of POP COUNTER1 in STACK1 position 1 and the previous two readings in STACK1 positions 2 and 3. These values are added together and appear as STACK1 TOTAL which is transferred back to the main program as POP COUNTER1. Similarly, the previous readings as STACK2 positions one, two, and three are similarly added together and form STACK2 TOTAL. These values are returned to the main program as POP COUNTER2.

Before leaving the routine, the contents of STACK1 are transferred to STACK2. When the average count of a subsequent stack is less than the average count of a previous stack, the computer controller program determines that the popping rate is declining. The accuracy of such determination depends upon fine tuning, by routine calibration, of the actual time of declining pop signals against the time of such decline as determined by the computer controller.

Other software averaging techniques can be employed. However, the simple moving average of three sample periods is effective to serve the purpose of limiting the impact of a transient reduction, or increase, in the sample count.

FIGS. 7-10 represent a programmable logic computer controller ladder diagram to match the flow charts of FIGS. 5 and 6. This ladder is machine dependent and is only shown here as exemplary of an acceptable electronic control system for a given popping machine 10.

Figure 7:
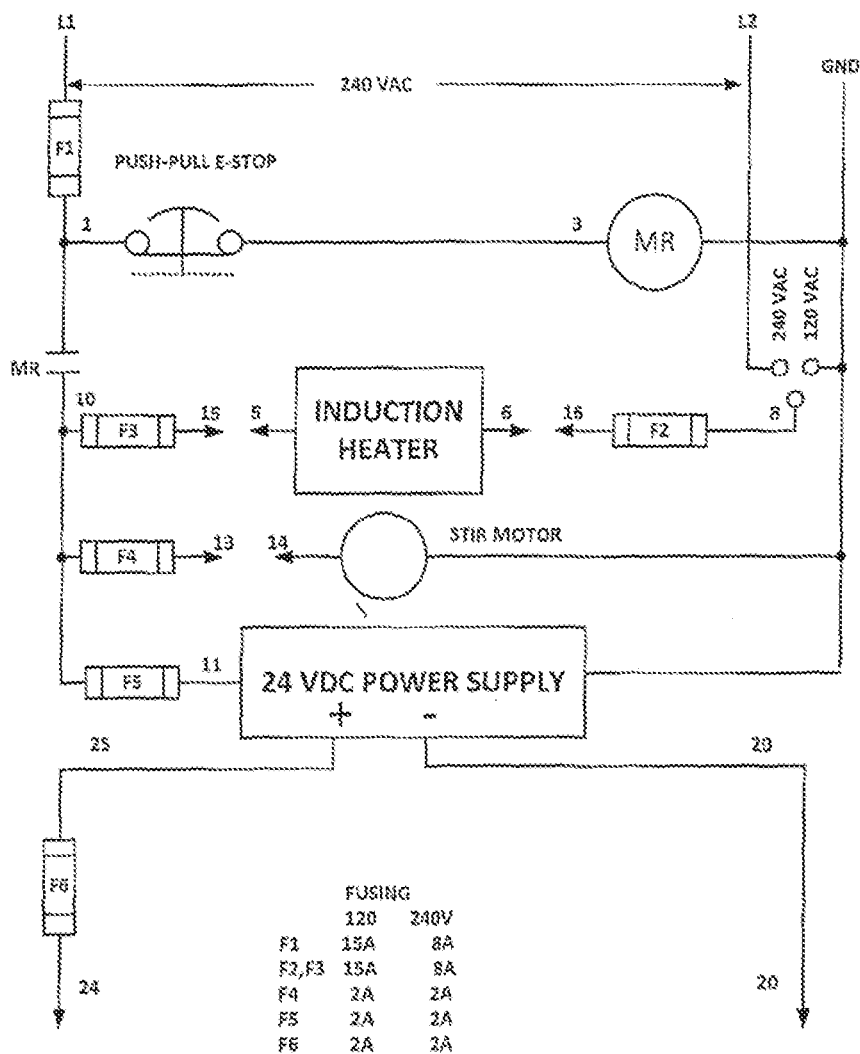
FIGS. 7-10 show a collective ladder diagram of the power, inputs, and outputs for the illustrated popcorn machine of the invention when controlled by a commercially available programmable logic computer.

FIG. 7 is the power wiring for this system. The system is designed to be operated with a 24 volt DC control system and a single phase 120 volt AC, optionally 240 volt AC, power supply source.

Figure 8:
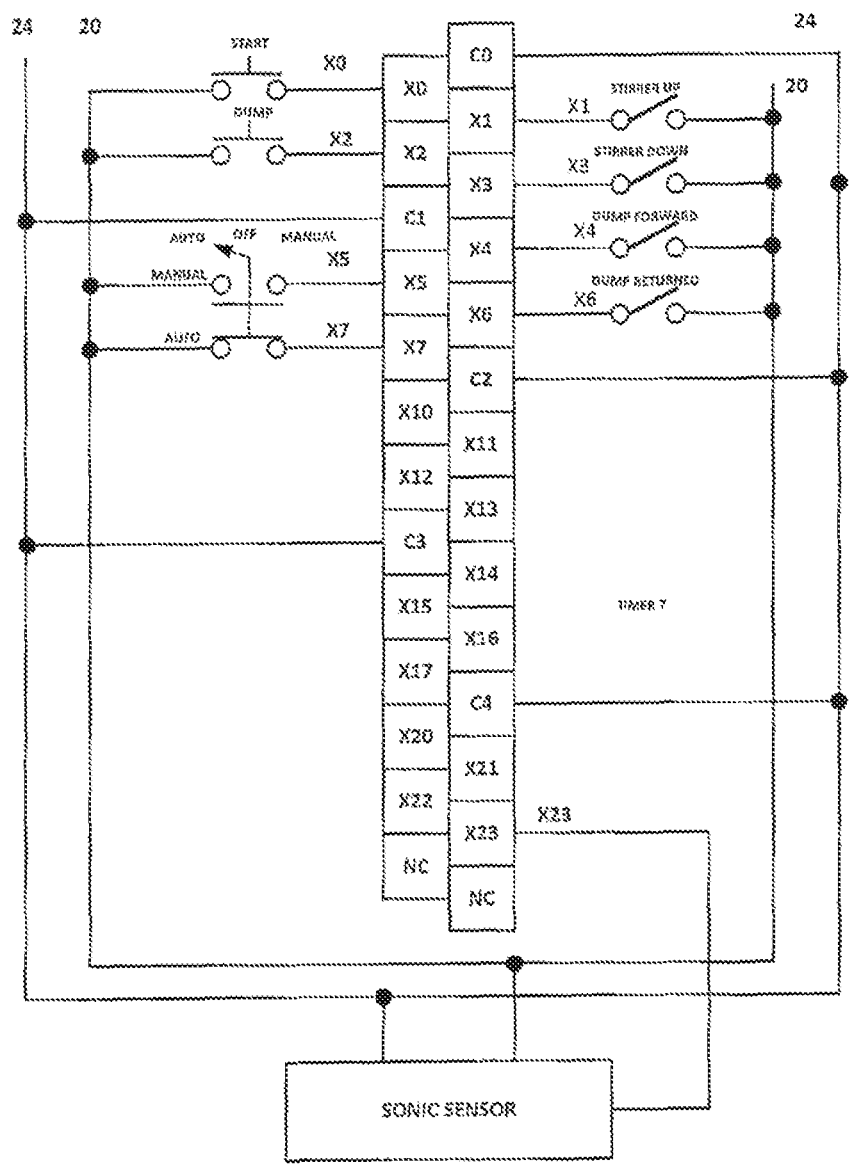

FIG. 8 represents the input configuration of programmable logic computer controller 36. In the embodiment illustrated, the inputs are all 24 volts DC inputs. Inputs for both the manual option and the automatic option are shown. The diagram is shown as, but not limited to, a commercially available PLC.

Figure 9:
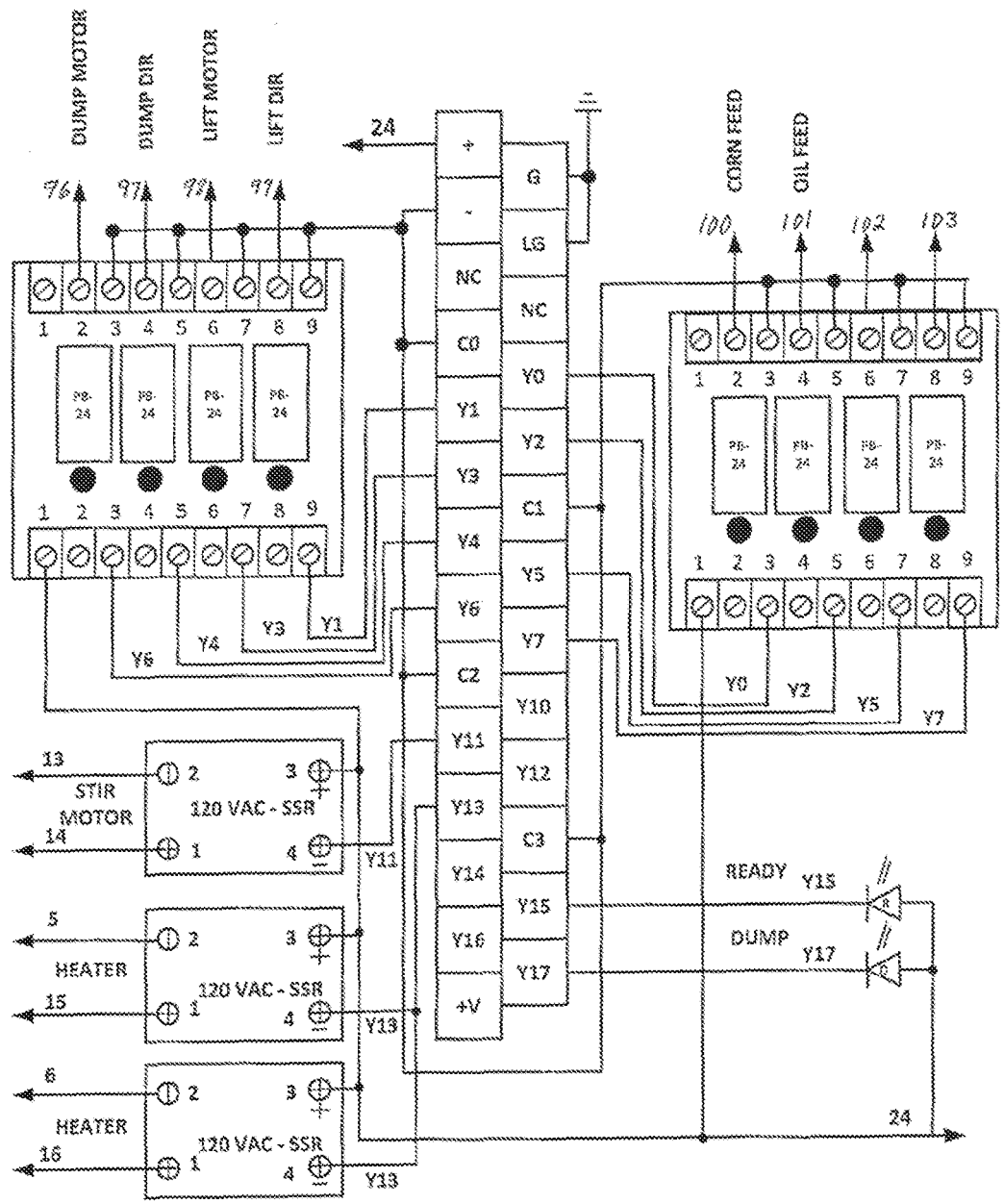

FIG. 9 shows the output configuration for a typical such programmable logic computer controller 36. Outputs 96-99 are power outputs which are a part of all methods of operation. Outputs 100-103 are used in auto fill applications. The diagram is shown as, but not limited to, a commercially available PLC. The agitator motor and heater outputs are all shown as 120 volts AC.

Figure 10:
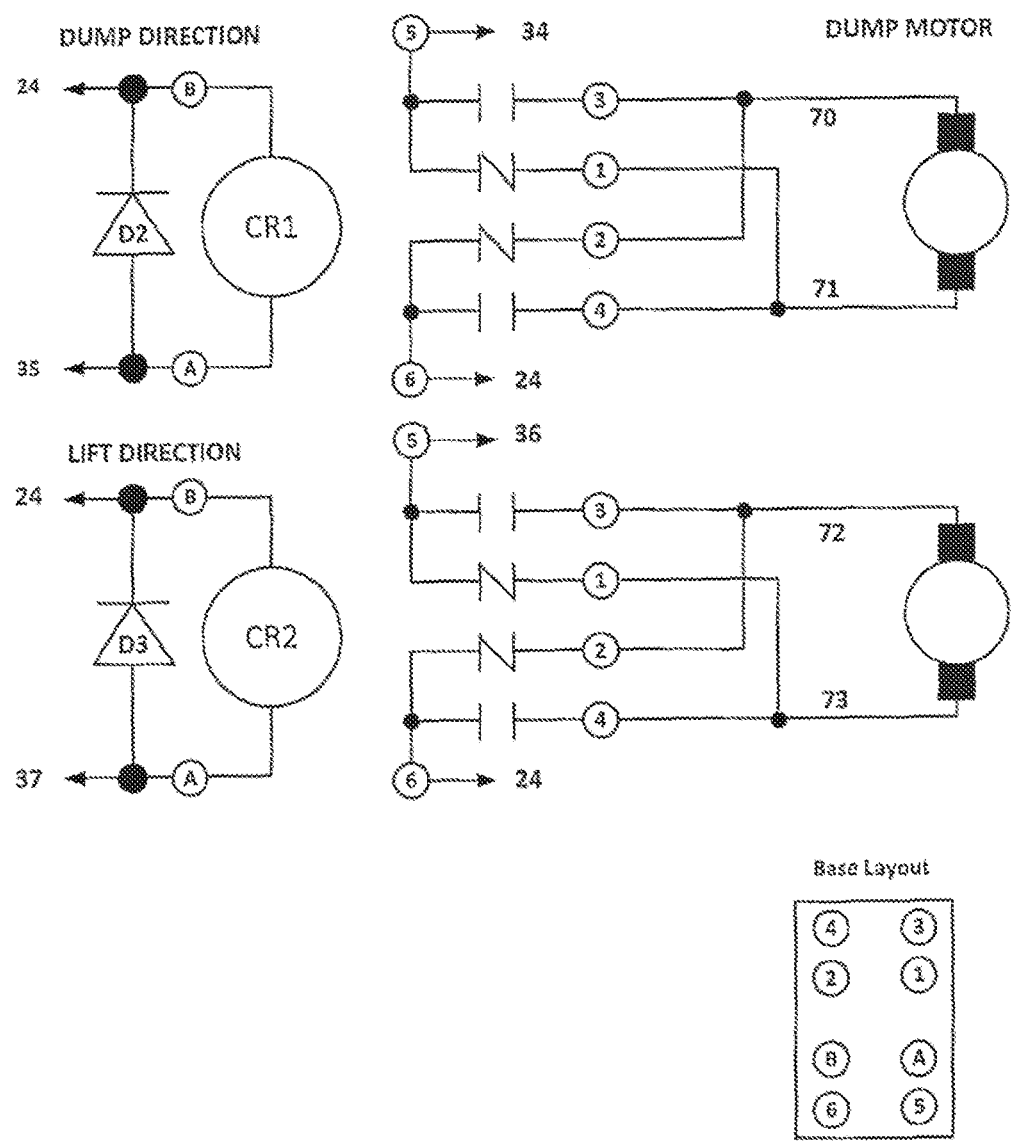

FIG. 10 shows a relay reversing system for the dump and agitator lift motors which are run in opposing directions. Other methods are contemplated and FIG. 10 is shown for illustration purposes only.

The invention is not limited in its application to the details of construction, or to the arrangement of the components set forth in the following description or illustrated in the drawings. The invention is capable of other embodiments or of being practiced or carried out in various other ways. Also, it is to be understood that the terminology and phraseology employed herein is for purpose of description and illustration and should not be regarded as limiting. Like reference numerals are used to indicate like components.

Having thus described the invention, what is claimed is:

1. A popping system for popping popcorn, comprising: a kettle adapted and configured to receive popcorn; a heater adapted to heat the kettle;
    an audio sensor positioned in sufficient proximity to the kettle to sense popping sounds of popcorn popping inside the kettle, the audio sensor generating a series of pop signals, where each pop signal represents a time when the sound of at least one kernel of popcorn popping is detected; and
    a controller adapted and configured to receive information representative of respective such pop signals, to identify a sequence of popping rates over corresponding periods of time based on the pop signals so received, to issue a heat control command to the heater based on changes in the popping rates, and to continue monitoring the pop signals before and after issuing the heat control command; and a signal counter monitored by the controller, the signal counter adapted to receive the pop signals sensed by the audio sensor and to count the number of pop signals, greater than 1, so received over a given sampling period of time, thus to generate sample counts, each sample count representing a number of pops counted over a respective such sampling period of time; wherein the controller monitors the rate of popping sensed by the sensor and issues commands to turn off heat to the kettle, and to dump the popped popcorn contents from the kettle, basing the occurrence of such commands on the point in the cycle at which the decline in the popping rate is sensed and detected, and the popping rate declines to a predetermined popping rate.

2. The popping system of claim 1 wherein the controller determines changes in the popping rates based on the pop signals, and issues the heat control command based on the determined popping rate changes.

3. The popping system of claim 1 wherein a second such sampling period of time overlaps the first such sampling period of time.

4. The popping system of claim 1, further comprising count accumulation capability which stores the sample counts in electronic memory.

5. The popping system of claim 1 wherein the controller turns off heat to the kettle no later than when the popping rate reflects a persistent reduction in the number of pops occurring in the kettle.

6. The popping system of claim 1, wherein the controller delays issuing the heat control command to the kettle until the number of counts in at least second and third sample counts are less than the number of counts in a first sample count, where all sample counts are taken in periods of time which are substantially equal in length.

7. The popping system of claim 1, wherein the controller delays issuing the heat control command to the kettle until the number of counts, collectively, in second and third sample counts is less than the number of counts, collectively, in a first sample count and the second sample count, and wherein all such counts are taken over periods of time which are substantially equal in length.

8. The popping system of claim 1, wherein the controller ignores transient reductions in sample count.

9. The popping system of claim 1, wherein the controller discriminates between temporary reductions in sample count, and persistent reduction in sample count to cessation of counting associated with dumping popped popcorn from the kettle.

10. The popping system of claim 1 wherein the heater is an induction heater which is a separate and distinct element, not part of the kettle.

11. The popping system of claim 1 wherein the kettle is free from power cabling to the extent that the kettle can be moved and dumped without moving any power cabling.

12. The popping system of claim 1, using multiple sampling periods of time, wherein the sampling periods overlap each other.

13. The popping system of claim 1, wherein the controller is also configured to issue a kettle dump command in response to the pop signals that are monitored after issuing the heat control command.

14. A popping system for popping popcorn, comprising: a kettle adapted and configured to receive popcorn; a heater adapted to heat the kettle; an audio sensor positioned proximate the kettle to sense popping sounds of popcorn popping inside the kettle, the audio sensor generating pop signals in response to the sensed popping sounds; and a controller coupled to the audio sensor to receive information representative of the pop signals, the controller also coupled to the heater, the controller configured to monitor popping rate based on the received information and to issue a heat control command to the heater based on a first decrease criterion of the monitored popping rate, the controller further configured to continue monitoring popping rate before and after issuing the heat control command; wherein the first decrease criterion comprises detecting fewer pop signals in a current sampling period than in a first prior sampling period; wherein the controller monitors the rate of popping sensed by the sensor and issues commands to turn off heat to the kettle, and to dump the popped popcorn contents from the kettle, basing the occurrence of such commands on the point in the cycle at which the decline in the popping rate is sensed and detected, and the popping rate declines to a predetermined popping rate.

15. The popping system of claim 14, wherein the heat control command includes a command to turn the heater off.

16. The popping system of claim 14, further comprising:
an actuator coupled to tip the kettle to dump its contents;
wherein the controller is also coupled to the actuator.

17. The popping system of claim 16, wherein the controller is configured to issue a dump command to the actuator based on a second decrease criterion of the monitored popping rate, the second decrease criterion being different from the first decrease criterion.

18. The popping system of claim 16, wherein the controller includes an input coupled to the audio sensor, a first output coupled to the heater, and a second output coupled to the actuator.

19. The popping system of claim 14, wherein the first decrease criterion further comprises detecting fewer pop signals in the first prior sampling period than in a second prior sampling period.

20. The popping system of claim 14, wherein the current sampling period and the first prior sampling period each have a length in a range from 3 to 10 seconds.

21. The popping system of claim 14, further comprising:
a cabinet on which the kettle, the heater, the audio sensor, and the controller are mounted.

22. The popping system of claim 16, further comprising:
a cabinet on which the kettle, the heater, the audio sensor, the controller, and the actuator are mounted.

* * * * *